2,935,519

METHOD FOR THE PREPARATION OF 21-ACYL-OXY-17α-HYDROXY-3-KETOSTEROIDS

Alberto Ercoli, Milan, Italy, assignor to Francesco Vismara Societa per Azioni, Como, Italy, a corporation of Italy No Drawing. Application February 25, 1958
Serial No. 717,299

8 Claims. (Cl. 260—397.4)

The present invention relates to an improved method for the introduction of the oxygen function at the 21-position of 21-desoxy-3-ketosteroids.

More particularly, this invention relates to the conversion of 17α-hydroxy-3,20-diketosteroids to the corresponding 21-acyloxy-derivatives and to important novel intermediates in said conversion.

The novel process of the present invention and the novel compounds produced therein may be represented by the following sequence of reactions:

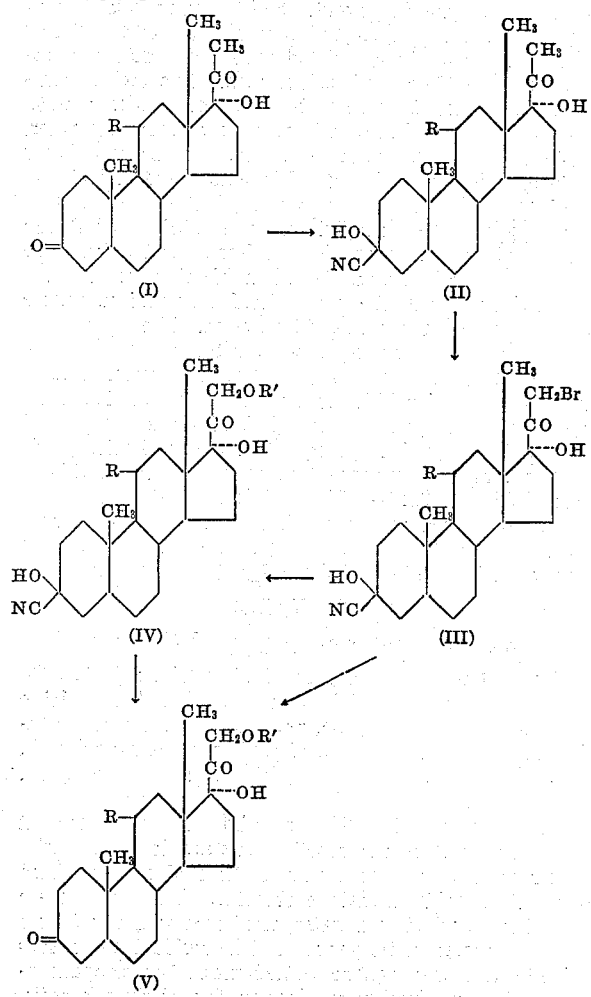

wherein R is selected from hydrogen, an α-hydroxy group, a β-hydroxy group and a ketonic oxygen (=O); wherein the hydrogen at the 5 position has either the normal (β-pregnane) or the allo configuration (α-pregnane) and wherein R' represents an alkanoyl radical containing not more than six carbon atoms.

According to the novel sequence of the present invention a selective reaction is used to cause the blocking of the 3-ketogroup of the starting steroid; this selective reaction consists of treating a 17α-hydroxy-3,20-diketosteroid (I) with acetone cyanohydrin as a donor of hydrogen cyanide, in the presence of a reaction catalyst to produce a 17α-hydroxy-3,20-diketosteroid, 3-monocyanohydrin (II). Bromination, with bromine, of a cyanohydrin of Formula II is productive of a 21-bromo-17α-hydroxy-3,20-diketosteroid, 3-monocyanohydrin (III), from which, by replacing the bromine atom in the 21-position by an acyloxy group and eliminating the hydrogen cyanide from the 3-position, a 21-acyloxy-17α-hydroxy-3,20-diketosteroid of Formula V is obtained.

The sequence of reactions may be accomplished either with or without isolation of intermediates.

It is an object of the present invention to provide an improved method for the production of 21-acyloxy-17α-hydroxy-3,20-diketosteroids, particularly one by which higher yields and greater economy of operation are obtained.

Another object of the invention is to provide a method whereby a 21-acyloxy-17α-hydroxy-3,20-diketosteroid is prepared from the corresponding 21-desoxy derivative.

A further object of the present invention is to provide the novel compounds, 17α-hydroxy-3,20-diketosteroids, 3-monocyanohydrin (II) which permit one to convert a 17α-hydroxy-3,20-diketosteroid of Formula I into the corresponding 21-acyloxy-derivative of Formula V.

Starting steroids for the process of the present invention are: 17α-hydroxypregnane-3,20-dione; 17α-hydroxyallopregnane - 3,20 - dione; 17α - hydroxypregnane - 3, 11,20 - trione; 17α - hydroxyallopregnane - 3,11,20 - trione; 11α,17α-dihydroxypregnane-3,20-dione; and 11β,17α-dihydroxy - pregnane - 3,20 - dione. The formation of a 3-monocyanohydrin of these compounds before they are reacted with bromine allows the selective introduction of the bromine at the 21-position. If a 3-monocyanohydrin is not formed the bromination occurs preferably in the ring A instead of in the 21-position and causes the formation of products not suitable to the continuance of the process.

For this reason the practical method known in the art for the introduction of the oxygen function at the 21-position utilizes, as a starting material, a 3-hydroxy-20-ketosteroid. This route is nevertheless very complicated and involves additional steps which include a previous reduction to convert selectively the 3,20-diketone into the 3-hydroxy-20-ketone (such a reduction is very difficult to carry out owing to the polyfunctional character of this class of compounds) and of course a subsequent oxidation to restore the 3-keto group. This step is carried out after bromination at the 21-position or after the 21-acyloxy group has been introduced into the molecule. Each of the intermediate compounds thus obtained is isolated and purified prior to its use in the next step and the yield in 21-bromo and consequently in 21-acyloxy-derivative is poor.

In contrast the method of the present invention avoids undesirable complications and converts a 17α-hydroxy-3,20-diketosteroid to the corresponding 21-acyloxy derivative in good yield.

In carrying out the method of this invention a 17α-hydroxy-3,20-diketo-5α or 5β-pregnane (corresponding to above Formula I) is treated with acetone cyanohydrin, as a donor of hydrogen cyanide, in the presence of a basic catalyst. As a catalyst, alkaline cyanides, ammonia and organic bases such as pyridine, ethanolamine, dimethylamine, trimethylamine, triethylamine and the like may be used, triethylamine being the most suitable. The reaction can be conducted in an organic solvent which is non-reactive under the reaction conditions, such as methanol, ethanol, methylene chloride, chloroform and the like. Generally the reaction is started by mild heating and carried to completion by allowing the mixture to stay at room temperature over a period from two to forty hours. During this treatment only the 3-carbonyl group reacts with acetone cyanohydrin, while the 20-ketogroup and, if present, the 11-ketogroup do not enter into the reaction.

Thus only a 3-mono-cyanohydrin is formed, which is a mixture of two epimers: $3\alpha,17\alpha$-dihydroxy-$3\beta$-cyano-20-ketopregnane and $3\beta,17\alpha$-dihydroxy-$3\alpha$-cyano-20-ketopregnane.

The mono-cyanohydrin is obtained from the reaction mixture by careful dilution with acidulated water and subsequent separation or extraction of the reaction organic phase with an organic solvent such as methylene chloride, chloroform and the like.

The solution containing the mono-cyanohydrin, suitably dried, is directly employed in the next step of the process although, if desired, the mono-cyanohydrin can be isolated by evaporating the solvent to dryness and purifying the residual product by treatment with a suitable organic solvent. The bromination step is carried out by treating the monocyanohydrin, in solution in an organic solvent such as methylene chloride, chloroform and the like, with at least the theoretical amount of bromine dissolved in the same solvent as that in which the reaction is performed. The temperature of the reaction is usually maintained between about zero and about 30° C. The time required by the reaction is not critical and can vary from one or more hours, depending on the reaction temperature. During the bromination only a mole of bromine is absorbed, while the cyanohydrin in position 3 remains unaltered, as shown by N determinations carried out on the brominated product. Generally the 3-monocyanohydrin of the 21-bromo-derivative is obtained as an oily product, which can be directly transformed into the 21-acyloxy-$17\alpha$-hydroxy-3,20-diketopregnane by treatment with an acylated metal such as for instance potassium acetate, potassium trimethylacetate, and other appropriate potassium acylates. The reaction is carried out in a boiling organic solvent, such as acetone, alcohol and dioxane for a period of ordinarily not less than seven hours. This treatment effects the simultaneous substitution of the 21 bromine with an acylate and the elimination of the hydrogen cyanide of the molecule, with restoration of the starting ketogroup at the 3-position.

With a slight variation of the process according to the invention, the conversion of a 3-monocyanohydrin of the 21-bromo-derivative into the corresponding 3-keto-21-acyloxy-derivative may be effected, with two steps instead of one, the reaction passing through the intermediate 3-monocyanohydrin of 21-acyloxy-3,20-diketopregnane (IV) which may also be isolated and identified.

For this purpose the 3-monocyanohydrin of the 21-bromo-derivative is treated with a carboxylic organic acid containing no more than six carbon atoms, in the presence of an alkali metal or ammonium bicarbonate in an amount stoichiometrically less than the amount of acid used. The reaction carried out in a boiling organic solvent for a short period, generally not more than two hours, yields the 3-monocyanohydrin of the 21-acyloxy-derivative which may be isolated and identified. From this latter compound, by careful hydrolysis with a weak organic base such as pyridine or also in the presence of an alkaline bicarbonate, elimination of the hydrogen cyanide from the molecule occurs and the 3-ketogroup is restored.

The yields of 21-acyloxy-$17\alpha$-hydroxy-3,20-diketosteroid are generally good. Yields about 60–70% of the theoretical are obtained when the whole sequence of reactions is carried out without isolation of the intermediates.

The 21-acyloxy-$17\alpha$-hydroxy-3,20-diketosteroids, produced according to the method of the present invention, are useful precursors of physiologically active steroids such as cortisone ($17\alpha,21$-dihydroxy-4-pregnene-3,11,20-trione), Kendall's Compound F ($11\beta,17\alpha,21$-trihydroxy-4-pregnene-3,20-dione), Reichstein's Compound S ($17\alpha,21$-dihydroxy-4-pregnene-3,20-dione), prednisone ($17\alpha,21$-dihydroxy-1,4-pregnadiene-3,11,20-trione), prednisolone ($11\beta,17\alpha,21$-trihydroxy-1,4-pregnadiene-3,20-dione) and esters of the same. For example cortisone acetate is prepared from $17\alpha$-hydroxy-21-acetoxypregnane 3,11,20-trione by bromination to form the 4-bromo-product which by treatment with a nitrogen carbonyl reagent, such as semicarbazide, forms the carbonyl derivative at the 3-position with elimination of hydrogen halide from the 4(5)-position. Removal of the nitrogen carbonyl derivative with an exchange reagent such as pyruvic acid yields cortisone acetate.

Similarly Kendall's Compound F acetate is prepared from $11\beta,17\alpha$-dihydroxy-21-acetoxypregnane-3,20-dione and Reichstein's Compound S acetate is obtained from $17\alpha$-hydroxy-21-acetoxypregnane-3,20-dione.

The following examples are illustrative of the products and process of the invention but are not to be construed as limiting.

EXAMPLE 1

*$17\alpha$-hydroxy-21-acetoxypregnane-3,11,20-trione*

1 g. of $17\alpha$-hydroxypregnane-3,11,20-trione is dissolved, by gentle heating, in 2 cc. of acetone cyanohydrin. One drop of triethylamine is added and the mixture is allowed to stand at room temperature over night; then it is diluted with water slightly acidulated with acetic acid and extracted many times with chloroform. The collected extracts are washed twice with water, once with a 50% sodium bisulfite solution and again three times with water, and then dried over sodium sulfate. To the completely colorless solution 480 mg. of bromine (theoretical 462 mg.), dissolved in 5 cc. of chloroform, are added slowly. The absorption starts rapidly after the addition of a drop of hydrobromic acid and is complete after 1 hour. The solution is washed with a sodium bicarbonate solution, then with water until neutral, dried over sodium sulfate and carefully evaporated under vacuum. The oily residue taken up with 50 cc. of acetone is treated with 3 g. of melted potassium acetate and 12 mg. of potassium iodide. After refluxing for 15 hours most of the solvent is eliminated under vacuum and the mixture diluted with cool water. The crystalline precipitate filtered and dried yields 820 mg. of $17\alpha$-hydroxy-21-acetoxypregnane-3,11,20-trione melting at 215°–218° C. Yield about 70% of the theoretical based on the starting $17\alpha$-hydroxypregnantrione. A sample recrystallized from ether-ethyl acetate shows M. Pt. 225°–227° C.; $[\alpha]_D^{20}+84.5$ (acetone).

EXAMPLE 2

*$17\alpha$-hydroxy-21-acetoxy-pregnane-3,11,20-trione*

2 g. of $17\alpha$-hydroxypregnane-3,11,20-trione, M.P. 197–199° C., are suspended in 10 cc. of ethanol, containing two drops of triethylamine, and treated with gentle heating and agitation with 4 cc. of crude acetone cyanohydrin freshly prepared according to Wagner and Baizer (Org. Synt. 20, 43, Note I, 1940). During the treatment the product goes completely into solution. After 15 hours at room temperature the reaction mixture is diluted with water slightly acidulated with acetic acid and extracted three times with methylene chloride. The extracts are combined, washed with water, dried over sodium sulphate and evaporated under vacuum. The residual oil consists of $17\alpha$-hydroxy-pregnane-3,11,20-trione 3-monocyanohydrin. Without further purification this product is redissolved in 50 cc. of chloroform and brominated at room temperature with a 11 cc. of a 9.4% solution of bromine in chloroform. The time required for the absorption is about one hour.

The reaction mixture is washed with a dilute sodium bicarbonate solution and with water to neutrality, and then dried and concentrated to dryness under reduced pressure.

The residual oil consists of crude 17α-hydroxy-21-bromopregnane-3,11,20-trione-3-monocyanohydrin. It is taken up with 150 cc. of acetone and refluxed over a period of about two hours with 16 g. of potassium bicarbonate and 15 cc. of acetic acid.

After diluting with water and cooling 1.5 g. of crude 17α-hydroxy-21-acetoxypregnane-3,11,20-trione-3-monocyanohydrin are obtained. After crystallization from ethyl acetate-hexane the product shows a melting point of 214°–216° (dec.).

*Analysis.*—Found percent N: 3.01; for $C_{24}H_{33}O_6N$ calcd. percent N: 3.2.

500 mg. of the above obtained cyanohydrin are heated on a water bath over a twenty minute period with 3 cc. of pyridine and 0.5 cc. of water.

By dilution with cold water about 400 mg. of 17α-hydroxy-21-acetoxypregnane-3,11,20-trione are obtained, which recrystallized from ethyl acetate melts at 225–228° C. (yield about 40% of the theoretical value based on the starting 17α-hydroxy-pregnantrione).

Following the same procedure as above, other acyloxy groups may be substituted in the 21-position by reaction of 17α-hydroxy-21-bromopregnane-3,11,20-trione, 3-monocyanohydrin with the appropriate acylating agent. Such acyloxy groups include propionoxy, butyroyloxy, benzoyloxy, trimethylacetoxy and others.

EXAMPLE 3

*17α-hydroxy-21-acetoxypregnane-3,20-dione*

2 g. of 17α-hydroxypregnane 3,20-dione (M.P. 215°–217° C.) are dissolved in 20 cc. of hot ethanol and treated with 4 cc. of acetone cyanohydrin freshly prepared and 2 drops of triethylamine. The mixture is then allowed to stand overnight at room temperature. After dilution with water slightly acidulated with acetic acid and cooling, the precipitated product is filtered off. After recrystallization from ether-hexane the 17α-hydroxypregnane-3,20-dione, 3-monocyanohydrin melting at 180–185° C. (dec.) is obtained.

2 g. of above obtained 3-mono-cyanohydrin of 17α-hydroxypregnan 3,20-dione dissolved in 60 cc. of chloroform are brominated with 11.5 cc. of a 9.4% bromine solution in chloroform. After the absorption is complete, the mixture is washed with a dilute sodium bicarbonate solution and water and then evaporated to dryness in vacuo.

The residual oil consists of 17α-hydroxy-21-bromopregnane-3,20-dione, 3-monocyanohydrin. It is taken up with 140 cc. of acetone and refluxed over a period of 15 hours with 6 g. of potassium acetate freshly melted.

After evaporation of most of the solvent and dilution with water, a product is obtained which recrystallized from ethyl acetate-ether yields 17α-hydroxy-21-acetoxypregnane-3,20-dione melting at 192–195° C.

In the same manner other 17α-hydroxy-21-acyloxypregnane-3,20-diones are prepared from the 21-bromo-derivative by reaction with the appropriate potassium acylate, including 17α-hydroxy-21-propionoxypregnane-3,20-dione; 17α-hydroxy-21-trimethylacetoxypregnane-3,20-dione; 17α-hydroxy-21-butyryloxypregnane-3,20-dione; and the like.

EXAMPLE 4

*17α-hydroxy-21-acetoxyallopregnane-3,20-dione*

1 g. of 17α-hydroxyallopregnane-3,20-dione (M.P. 250°–253° C.), dissolved in 2 cc. of chloroform, is treated, with gentle heating, with 4 cc. of acetone-cyanohydrin and one drop of triethylamine. After a night at room temperature, the mixture is taken up with water slightly acidulated with acetic acid and extracted many times with chloroform; the collected extracts are washed with water, then with a 50% sodium bisulfite solution, and again with water until neutral. After drying over sodium sulfate, a solution of 500 mg. of bromine (theoretical 482 mg.) in 5 cc. of chloroform is added slowly during one hour. When the absorption is complete, the mixture is washed with a sodium bicarbonate solution and with water, dried and carefully evaporated under vacuum. The oily residue taken up with 50 cc. of acetone is refluxed over a period of 15 hours with 3 g. of freshly melted potassium acetate. By dilution and filtration, 700 mg. of product melting at 235°–240° C. are obtained (yield about 60%). After recrystallization from ethyl acetate, 17α-hydroxy-21-acetoxyallopregnane-3,20-dione melts at 247°–249° C.

EXAMPLE 5

*11β,17α-dihydroxy-21-acetoxypregnane-3,20-dione*

1 g. of 11β,17α-dihydroxypregnane-3,20-dione (M.P. 212°–213° C.), dissolved in 10 cc. of hot methanol, is treated with 2 cc. of acetone cyanohydrin and two drops of pyridine. After 15 hours at room temperature the mixture is diluted with water slightly acidulated with acetic acid, extracted with methylene chloride, washed with water and evaporated under vacuum.

The residue taken up with 40 cc. of chloroform is treated at 15–20° C. with 6 cc. of a 9.4% solution of bromine in chloroform over a period of 30 minutes. After stirring an additional 15 minutes, the mixture is washed with a sodium bicarbonate solution and with water and then concentrated to dryness in vacuo. The residue dissolved in 80 cc. of acetone is refluxed over a period of eight hours with 2 g. of potassium acetate. The acetone is distilled and the residue is extracted with methylene chloride. The extract is washed with water, dried over sodium sulfate and concentrated to an oily residue. Trituration of the residue with ether gives about 500 mg. of crude 11β,17α-dihydroxy-21-acetoxypregnane-3,20-dione (M.P. 198–200° C.) which twice crystallized from ethyl acetate-hexane melts at 216–218° C., undepressed on admixture with an authentic specimen.

EXAMPLE 6

*17α-hydroxy-21-acyloxyallopregnane-3,11,20-trione*

In the manner given in Example 1, 17α-hydroxyallopregnane 3,11,20-trione is converted to 17α-hydroxy-21-bromoallopregnane-3,11,20-trione, 3-mono-cyanohydrin, by reaction with acetone-cyanohydrin followed by bromination. In a manner similar to Example 1, 17α-hydroxy-21-acyloxyallopregnane-3,11,20-trione may be prepared by refluxing the 17α-hydroxy-21-bromoallopregnane-3,11,20-trione, 3-monocyanohydrin with a potassium acylate in acetone solution. Thus prepared 21-acyloxy-17α-hydroxyallopregnane triones include: 17α-hydroxy-21-acetoxyallopregnane-3,11,20-trione, 17α-hydroxy-21-propionoxyallopregnane-3,11,20-trione, 17α-hydroxy-21-trimethylacetoxyallopregnane - 3,11,20 - trione, 17α-hydroxy-21-benzoyloxyallopregnane-3,11,20-trione and others.

I claim:

1. 3,17α-dihydroxy-3-cyano-20-keto steroids of formula:

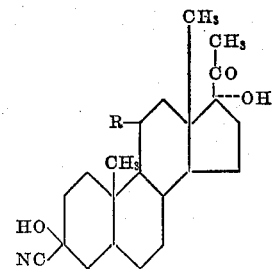

where R is selected from the group consisting of hydrogen, an α hydroxy group, a β hydroxy group and oxygen.

2. 21-bromo-3,17α-dihydroxy-3-cyano-20-keto steroids of formula:

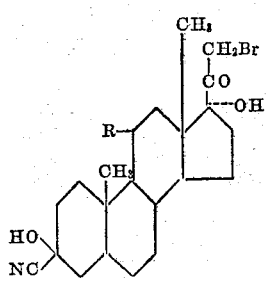

where R is selected from the group consisting of hydrogen, an α hydroxy group, a β hydroxy group and oxygen.

3. A process for the preparation of a steroid having the formula

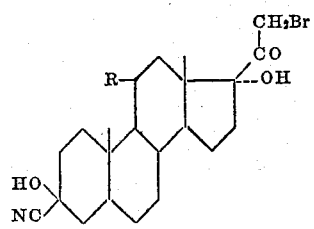

wherein R is selected from the group consisting of hydrogen, an α hydroxy group, a β hydroxy group and oxygen, which comprises reacting a steroid having the formula

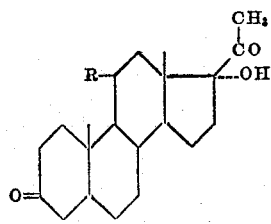

wherein R has the above meaning with acetone cyanohydrin to form the corresponding 3-hydroxy-3-cyano steroid and brominating said last-mentioned steroid in an inert organic solvent at a temperature of from about 0° C. to about 30° C. with bromine to form said first-mentioned steroid.

4. The process of claim 3 in which the reaction with acetone cyanohydrin is carried out in the presence of a basic catalyst selected from the group consisting of alkaline cyanides, ammonia, pyridine, ethanolamine, dimethylamine, trimethylamine, and triethylamine.

5. The process of claim 4 in which the bromination reaction is carried out in a reaction medium comprising a saturated liquid halogenated hydrocarbon.

6. The process of claim 3 in which the 21-bromosteroid is further reacted for at least seven hours in an inert organic solvent at its boiling temperature with an alkali metal salt of an alkanoic acid containing up to six carbon atoms to form in a single step, a steroid compound having the formula

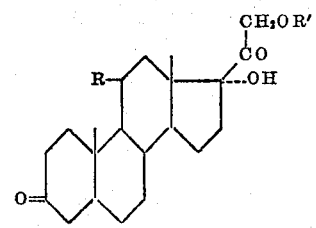

wherein R is selected from the group consisting of hydrogen, an α hydroxy group, a β hydroxy group and oxygen and $R^1$ is an alkanoyl group containing up to six carbon atoms.

7. The process of claim 3 in which the 21-bromo steroid is further reacted for no longer than two hours in an inert organic solvent at its boiling temperature with an alkanoic acid containing up to six carbon atoms in the presence of alkali bicarbonate in an amount stoichiometrically less than the amount of acid used to form a steroid having the formula

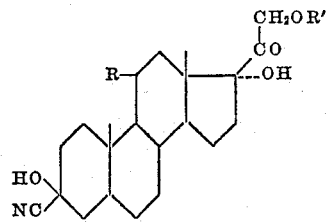

wherein R is selected from the group consisting of hydrogen, an α hydroxy group, a β hydroxy group and oxygen and $R^1$ is an alkanoyl group containing up to six carbon atoms; and said last-mentioned steroid is hydrolysed in the presence of a weak base to eliminate hydrogen cyanide and restore the ketogroup at the 3 position.

8. The process of claim 7 in which said weak base is selected from the group consisting of pyridine and an alkaline bicarbonate.

References Cited in the file of this patent
UNITED STATES PATENTS

| | | |
|---|---|---|
| 2,324,881 | Ruzicka et al. | July 20, 1943 |
| 2,853,500 | Rubin | Sept. 23, 1958 |